US006986249B2

(12) United States Patent
Bernard (10) Patent No.: US 6,986,249 B2
(45) Date of Patent: Jan. 17, 2006

(54) APPARATUS FOR COUPLING FORCE-ACTIVATED ACTUATORS

(75) Inventor: Guy Bernard, Kirkland (CA)

(73) Assignee: Bombardier Inc., Montreal (CA)

( * ) Notice: Subject to any disclaimer, the term of this patent is extended or adjusted under 35 U.S.C. 154(b) by 72 days.

(21) Appl. No.: 10/477,236

(22) PCT Filed: May 10, 2002

(86) PCT No.: PCT/CA02/00684

§ 371 (c)(1),
(2), (4) Date: Nov. 10, 2003

(87) PCT Pub. No.: WO02/091098

PCT Pub. Date: Nov. 14, 2002

(65) Prior Publication Data

US 2004/0159100 A1  Aug. 19, 2004

(30) Foreign Application Priority Data

May 10, 2001 (CA) .................................. 2347556

(51) Int. Cl.
*F15B 7/00* (2006.01)
(52) U.S. Cl. ......................................... 60/571; 91/427
(58) Field of Classification Search ................ 91/427; 60/571, 572; 244/226, 229

See application file for complete search history.

(56) References Cited

U.S. PATENT DOCUMENTS

| 2,397,270 | A | * | 3/1946 | Kelly ........................... 60/572 |
| 4,472,780 | A | | 9/1984 | Chenoweth et al. ......... 364/434 |
| 5,137,234 | A | | 8/1992 | Sakurai ........................ 244/234 |
| 5,377,950 | A | | 1/1995 | Salcudean et al. ........... 248/581 |
| 5,456,428 | A | | 10/1995 | Hegg ........................... 244/229 |
| 6,572,055 | B1 | * | 6/2003 | Bernard ....................... 244/229 |

FOREIGN PATENT DOCUMENTS

| CH | 223127 | 12/1942 |
| FR | 748649 | 7/1933 |
| FR | 2 558 136 | 7/1985 |
| WO | WO 01/11439 | 2/2001 |

OTHER PUBLICATIONS

Jeffrey W. Hegg and Marion P. Smith, "Sidestick Controllers for Advanced Aircraft Cockpits" in *Scientific Honeyweller*, Minneapolis, MIN, 1993, 70-77.

* cited by examiner

*Primary Examiner*—Edward K. Look
*Assistant Examiner*—Michael Leslie (57) ABSTRACT

An apparatus comprises first (3) and second (5) force-activated actuators, each having a fluid displacer (7, 9) and force control lever (19, 21) coupled to the fluid displacer, a conduit (15) for transporting fluid between the fluid displacers to couple motion of the fluid displacers, and a force controller (17) responsive to the pressure of the fluid for controlling a force opposing displacement of a fluid displacer.

58 Claims, 5 Drawing Sheets

APPARATUS FOR COUPLING FORCE-ACTIVATED ACTUATORS

CROSS REFERENCE TO RELATED APPLICATIONS

This application is a National Phase application of PCT/CA02/00684 filed May 10, 2002 claiming priority from Canadian Patent Application No. 2,347,556 filed May 10, 2001.

FIELD OF THE INVENTION

The present invention relates to an apparatus for coupling force-activated actuators and in particular to a coupling which enables the motion of one actuator to follow the motion of the other actuator, and vice versa.

BACKGROUND OF THE INVENTION

Commercial and other aircraft are generally equipped with two flight controllers so that the aircraft can be operated either by the pilot or a co-pilot. The aircraft controllers allow manual control of the various control surfaces of the aircraft to control pitch and roll. In a mechanical flight control system, the flight controllers may be linked to the control surfaces via cables and linkages as for example disclosed in U.S. Pat. No. 5,456,428 to Hegg, issued on $10^{th}$ Oct. 1995. In an electronically controlled aircraft, commonly known as a fly-by-wire aircraft, sidestick motion is transformed into electrical signals which are typically transmitted to the control surfaces via servo motors, actuators or similar devices. An example of a fly-by-wire control system is disclosed in U.S. Pat. No. 4,472,780 to Chenoweth, et al, issued on $18^{th}$ Sep. 1994.

Controlling an aircraft using electronic rather than mechanical flight controls allows the commands that are executed in the cockpit to be augmented by additional inputs from the flight control computers, and thereby allows for more efficient aircraft operation.

Presently available civil fly-by-wire systems control the aircraft using independently operable pilot and co-pilot sidesticks. There are significant operational and safety benefits of connecting the sidesticks to cause each to move in a pattern that is substantially identical to that of the other. One benefit of linking the sidesticks is to increase the level of safety by providing increased situational awareness for pilots. That is, the pilot and co-pilot will each be able to closely monitor what the other is doing. Thus, in the event that one of them improperly directs the aircraft (i.e. due to sudden illness) the other will immediately recognize the error and be able to correct it. Linking the two sidesticks is also beneficial for pilot training.

Human factor studies have shown that asymmetric forces on a sidestick are needed to provide optimum feel in the lateral roll control movement. This is mainly due to the fact that the arm muscles are stronger when working inboard than outboard. Uncoupled sidesticks have implemented this asymmetry by providing different feel springs for the inboard and outboard direction. Studies have shown that the inboard gradient should be approximately 50 percent higher than the outboard gradient. However, when such sidesticks are coupled together, the asymmetric feel force disappears and the resulting force gradient becomes an average value. Providing a system that will maintain asymmetric forces while ensuring position copy between the sidesticks therefore remains a significant design challenge. A few concepts have been proposed to implement asymmetric roll feel forces, as disclosed in U.S. Pat. No. 5,137,234 and French Patent No. 2,558,136. However, these coupling systems are relatively complex, requiring numerous mechanical components, high tolerances, and which are prone to wear and tear which limits their longevity.

SUMMARY OF THE INVENTION

According to one aspect of the present invention, there is provided an apparatus comprising first and second force-activated actuators, each comprising a fluid displacer and force receiving means coupled to the fluid displacer, a conduit for transporting fluid between said fluid displacers for coupling the motion of the fluid displacers and a force controller responsive to a parameter indicative of the direction of force applied to an actuator for controlling a force resisting displacement of a fluid displacer.

In one embodiment, the parameter indicative of the direction of force applied to an actuator is the pressure of the fluid. The inventor has realized that when a force is applied to one of the actuators such that the fluid displacer drives fluid towards the other fluid displacer, the other displacer tends to resist movement, placing the fluid in compression and raising its pressure above its ambient or equilibrium pressure. On the other hand, when a force is applied in the opposite direction such that the fluid displacer moves away from the other fluid displacer, the tendency of the other displacer to resist motion effectively places the fluid in "tension" so that the pressure of the fluid decreases below its ambient or equilibrium value. Advantageously, in embodiments of the present invention, the change in pressure of the fluid is used to couple an additional element into the system which tends to oppose the force applied to an actuator, and enables an asymmetric feel force to be achieved simply, reliably and inexpensively without the need for electronic sensors and server motors. Thus, when a force is applied to one of the actuators in one direction, the change in fluid pressure is used to couple the element into the system, thereby increasing the force needed to be applied to move the fluid displacer a certain distance, and when a force is applied in the opposite direction, the element is decoupled from the system thereby reducing the force required to move the fluid displacer an equal distance in the opposite direction.

The apparatus may be incorporated into any system in which the force required to move an actuator is desirably direction dependent (i.e. asymmetric), for example coupled hand controllers in a vehicle such as an aircraft where the hand controllers may be moved from side to side and an asymmetric feel is desirable between inboard and outboard movement.

In one embodiment, the force controller comprises resistance means for resisting movement of a fluid displacer, and switch means responsive to the fluid pressure for switchably coupling the resistance means to a fluid displacer. The resistance means may comprise any suitable arrangement for increasing the resistance of the fluid displacer to movement, and may for example comprise a resilient device, such as a spring which is switchably coupled to a fluid displacer. Although the resistance means may be arranged to provide an additional force which is independent of displacement, as may be provided by a mechanical damper, or a mechanical resistance, for example provided by friction, preferably, the resistance means provides a force which varies with displacement of the fluid displacer, for example such that the opposing force increases with displacement, as may be provided by a resilient member, such a spring.

In one embodiment, the resistance means includes a third fluid displacer coupleable to at least one of the first and second fluid displacers by means of a fluid therebetween, and wherein the switch is operable to couple the third fluid displacer to at least one of the first and second fluid displacers by permitting fluid communication therebetween.

In one embodiment, the switch is operable to divert fluid from the conduit to the third fluid displacer.

In one embodiment, the fluid displacer has first and second ends, and the switch is operable to permit fluid communication between the first fluid displacer and the first end and between the second fluid displacer and the second end.

According to another aspect of the present invention, there is provided an apparatus comprising first and second force-activated controllers, a coupling for coupling motion of said controllers, and a force controller responsive to a parameter indicative of the direction of force applied to a controller for controlling a force opposing displacement of said controllers and comprising a fluid displacer coupled to a controller, resistance means for receiving fluid and valve means responsive to said parameter for causing fluid to be introduced to said resistance means by said fluid displacer.

In this arrangement, the additional force which provides the direction-dependent asymmetry in the force required to displace the coupled controllers is provided by a fluid system which is effectively switchably coupled and decoupled to and from the controllers. The switch comprises a valve which causes fluid which is coupled to the controllers to be selectively introduced to a resistance system which tends to oppose the introduction of fluid thereto. Advantageously, the provision of a fluid system to provide the asymmetric feel forces allows the system to be simplified over systems which employ solid mechanical linkages which have been proposed hereto.

According to another aspect of the present invention, there is provided an apparatus comprising first and second force-activated actuators, said first actuator having a first movable controller and said second actuator having a second movable controller, first and second fluid coupling systems coupling said first and second controllers, and coupling means for permitting fluid to flow between said first and second systems at least one of (1) when said first and second controllers are in a predetermined position and (2) when substantially no external force is applied to said controllers, and (3) when any difference in the pressure of fluid between said first and second coupling systems falls below a predetermined value.

According to another aspect of the present invention, there is provided an apparatus comprising first and second force-activated actuators, said first actuator having a first movable controller and said second actuator having a second movable controller, first and second fluid coupling systems coupling said first and second controllers, and coupling means for permitting fluid to flow between said first and second systems when said first and second controllers are in a predetermined position.

According to another aspect of the present invention, there is provided an apparatus comprising first and second force-activated actuators, said first actuator having a first movable controller and said second actuator having a second movable controller, a fluid coupling coupling said first and second controllers, a fluid accumulator and pressure responsive means responsive to the pressure of fluid of said fluid coupling for permitting fluid from said coupling to flow into said accumulator when the pressure of fluid in said coupling exceeds a predetermined value.

According to another aspect of the present invention, there is provided an apparatus comprising first and second force-activated actuators, said first actuator having a first movable controller and said second actuator having a second movable controller, first and second fluid coupling systems coupling said first and second controllers and an electrically operated valve for switchably coupling and decoupling said first fluid coupling system to said second fluid coupling system, wherein said valve is adapted to permit fluid to flow between first and second fluid coupling systems in the absence of electrical power thereto.

BRIEF DESCRIPTION OF THE DRAWINGS

Examples of embodiments of the present invention will now be described with reference to the drawings, in which.

DESCRIPTION OF EMBODIMENTS

Figure 1:
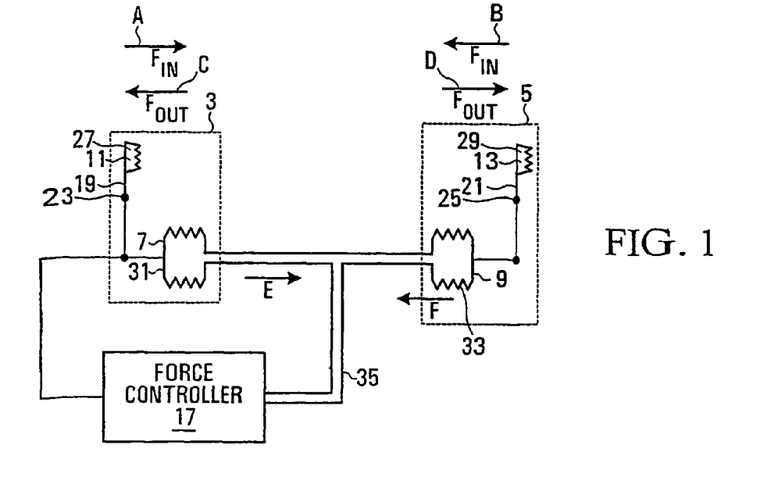
FIG. 1 shows a schematic diagram of a coupling apparatus according to an embodiment of the present invention.

Referring to FIG. 1, an apparatus 1, according to an embodiment of the present invention, comprises first and second force-activated actuators 3, 5, each comprising a fluid displacer 7, 9 and a controller 11, 13 coupled to the fluid displacer 7, 9. The apparatus further comprises a conduit 15 for transporting fluid between the fluid displacers 7, 9 for coupling their motion, and a force controller 17, which is responsive to the pressure of the fluid, for controlling a force which opposes displacement of a fluid displacer 7, 9.

In this embodiment, each controller 11, 13 comprises a lever 19, 21 pivotally mounted between its ends at a pivot point 23, 25 and each lever is coupled to a respective fluid displacer 7, 9 below the pivot point 23, 25. Each controller 11, 13 may further include a hand grip 27, 29 located above the pivot point 23, 25.

In this embodiment, the fluid displacers 7, 9 each comprise an end wall of a bellows 31, 33 which are interconnected by the conduit 15. The force controller 17 has access to the fluid, and in this embodiment, the access is provided by a fluid line 35 connected to the conduit 15, although other embodiments may have any other suitable arrangement for enabling the force controller 17 to access the fluid.

The force controller 17 further includes an arrangement for providing an additional force which opposes motion of the fluid displacer 7, and which is coupled to or decoupled from the fluid displacer depending on the fluid pressure.

In operation, when an inboard force $F_{IN}$ is applied to either controller 11, 13, in the direction indicated by arrows A and B, respectively, the displacer 7, 9 to which the controller is coupled moves outwardly, i.e. in the opposite direction, which causes the bellows to expand and draw fluid into the bellows from the conduit. In turn, fluid is drawn from the other bellows, causing the other bellows to contract and the other fluid displacer and controller to follow the motion of the driven fluid displacer and controller. The indirectly driven actuator inherently tends to oppose motion and this characteristic may be referred to as "force fight". In the present embodiment, this inherent tendency is provided by the resiliency of the flexible walls of the bellows, the inertia of the fluid displacer and components connected thereto, such as the controller and the coupling which couples the controller to the fluid displacer, together with any frictional forces, for example, at the pivot. This resistance to motion causes a reduction in the pressure of the fluid coupling when an inboard force is applied to one of the controllers. This reduction of fluid pressure may be used by the force into the system controller to couple an additional force which tends to oppose motion of the fluid displacers.

On the other hand, when an outboard force is applied to one of the controllers 11, 13, as indicated by the direction of arrows C and D, respectively, the fluid displacer moves in the opposite direction, contracting the bellows and pushing fluid from the bellows into the conduit. Fluid is thereby forced into the other bellows which expand, causing its associated fluid displacer and controller to follow the motion of the driven displacer and controller. The inherent force fight associated with the indirectly driven actuator, which tends to oppose motion, results in a compressional force on the fluid. This increase in pressure is used by the force controller 17 to reduce the force opposing motion of the displacers, by for example, decoupling an additional force element from the system, thereby reducing the outboard force required to move the controller a certain distance in comparison with the required inboard force. The force controller may be arranged to provide any desired difference in the direction dependent opposing forces of the coupling, for example to compensate for the asymmetry in the strength of the human arm between inward and outward movement.

Figure 2:
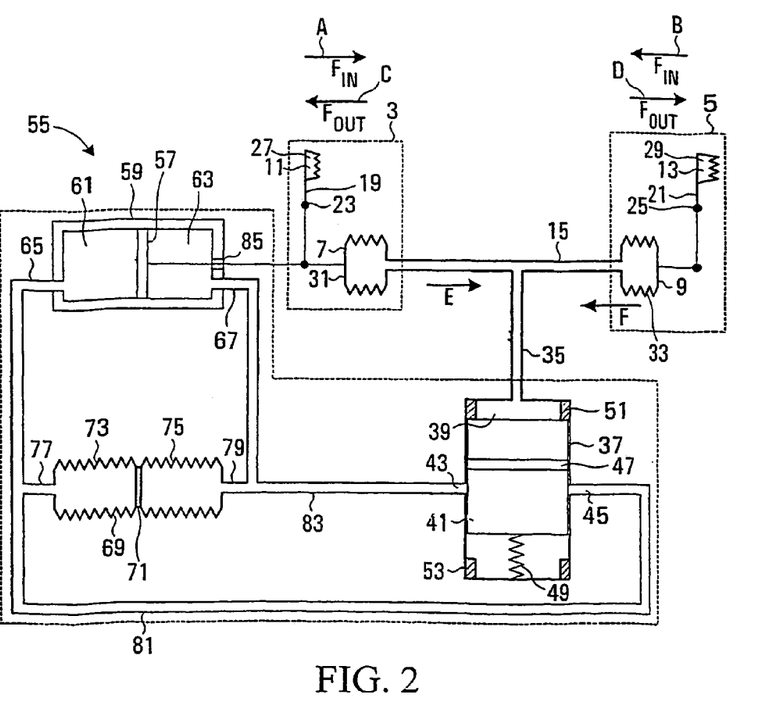
FIG. 2 shows a schematic diagram of a coupling apparatus according to another embodiment of the present invention.

Another example of a coupling apparatus according to an embodiment of the present invention is shown in FIG. 2, in which an embodiment of a force controller is shown in more detail. Referring to FIG. 2, the coupling apparatus 1 is similar to that shown in FIG. 1, and like parts are designated by the same reference numerals. In this embodiment, the force controller 17 comprises a switch valve 37 having a chamber 39 and a piston 41 disposed within the chamber. The chamber is in fluid communication with the conduit 15 via a fluid line 35. The switch valve 37 has a fluid inlet port 43 and a fluid outlet port 45, and switchably connects the inlet port 43 to the outlet port 45 in response to fluid pressure which controls the position of the piston 41. The piston has a through hole 47 which serves to connect the fluid inlet port 43 to the outlet port 45 when the piston is displaced such that the through hole 47 is aligned with the inlet port 43.

In this embodiment, the piston is biased towards the end of the chamber 39 which is connected to the fluid line 35 by a biasing means, such as a spring so that the switch assumes a position in which the inlet port is disconnected from the outlet port. The chamber may include a first stop 51 to arrest travel of the piston towards the fluid line 35, and may further include a second stop 53 to prevent further travel of the piston 41 in the opposite direction on alignment of the through hole 47 with the fluid inlet/outlet ports 43, 45.

The force controller further comprises an arrangement for introducing an additional force which opposes motion of the fluid displacers which is coupled into the system when an inboard force is applied to either controller and which is decoupled from the system when an outboard force is applied to either controller. The arrangement 55 comprises a piston 57 which is coupled to the first fluid displacer 7 and a cylinder 59 enclosing the piston and which is divided by the piston into a first chamber 61 and a second chamber 63. The first chamber 61 includes a first inlet/outlet port 65 which is connected to the second inlet/outlet port 45 of the switch valve 37 via a fluid line 81, and the second chamber 63 has a fluid inlet/outlet port 67 which is connected to the first inlet/outlet port 43 of the switch valve 37 via a fluid line 83. The arrangement 55 further includes a resilient device 69 that provides a force which opposes its displacement when subjected to fluid pressure, and in the present embodiment is provided by a third bellows having a partition 71 which constitutes a fluid displacer, and which divides the bellows into first and second bellows chambers 73, 75. The first bellows chamber 73 has a fluid inlet/outlet port 77 which is connected to the second fluid inlet/outlet port 45 of the switch valve 37 via the fluid line 81, and the second bellows chamber 75 has a fluid inlet/outlet port 79 which is connected to the first fluid inlet/outlet port 43 of the switch valve 37 via the fluid line 83.

In operation, when an outboard force is applied to one of the controllers 11, 13, as indicated by the direction of the arrows C and D, respectively, the fluid pressure between the first and second fluid displacers 7, 9 increases due to the force fight of the indirectly driven actuator, thereby displacing the switch valve piston 41 against the spring 49, so that the switch valve connects the first inlet/outlet port 43 to the second inlet/outlet port 45. As the controller is displaced in the outboard direction, the piston 57 moves in the opposite inboard direction, causing fluid in the right hand chamber 63 to flow through the second inlet/output port 67 and into the left hand chamber 61 via the switch valve 37. The passages through which the fluid flows may be dimensioned so as to produce little resistance to the fluid flow so that the cylinder/piston combination has little effect on the force required to move the controllers. In this position, the bellows 69, which provides a higher resistance to fluid pressure than the fluid conduits and valve connecting the first and second cylinder chambers 61, 63, is effectively short circuited and decoupled from the fluid displacers by the switch valve 37.

On the other hand, when either no force or an inboard force is applied to the controllers, the fluid pressure in the conduit 15 is either at equilibrium (zero force) or falls below equilibrium (inboard force), and the switch valve piston 41 assumes a default position by virtue of the bias spring 49, in which the first inlet/outlet port 43 is disconnected from the second inlet/outlet port 45. In this position, as either one or other controller 11, 13 is moved inboard, the piston 57 moves outboard, forcing fluid out of the left hand chamber 61, and into the first bellows chamber 73 which then expands against the resiliency of the bellows walls, and displaces the fluid displacer 71 to the right. As the fluid displacer 71 is displaced to the right, the second bellows chamber 75 contracts and fluid passes from the second bellows chamber 75 and is drawn into the second cylinder chamber 63 as the chamber expands on movement of the piston 57 to the left. Thus, the switch valve 37 effectively operates to couple an additional bellows to the first fluid displacer, and also to the second fluid displacer by virtue of the fluid coupling, thereby providing an additional force which opposes the inboard force applied to a controller 11, 13.

When an outboard force is next applied to a controller, the switch valve returns to a position in which the valve inlet port 43 is coupled to the valve outlet port 45, thereby allowing fluid to circulate freely between the left and right hand cylinder chambers 61, 63, and decoupling the third bellows 69 from the fluid displacers. At the same time, fluid is free to circulate between the first and second bellows chambers 73, 75, allowing the pressure of the fluid in the chambers to equalize and the third fluid displacer 71 to return to its neutral position.

The embodiment shown in FIG. 2 is an example of a coupling apparatus in which the additional force is provided by a fluid circuit which remains separate from the fluid coupling between the fluid displacers. In another embodiment, the force controller may include additional force providing elements which are switchably coupled into the fluid system which couples the actuators. Furthermore, although the fluid system which couples the actuators of the embodiment of FIG. 2 has a single conduit coupling two fluid displacers, another embodiment may include a second fluid carrying conduit and a second pair of fluid displacers arranged so that fluid in one of the two conduits is always under compression for inboard or outboard motion of the controller. Another embodiment of a coupling apparatus incorporating the above two features is shown in FIGS. 3 and 4.

Figure 3:
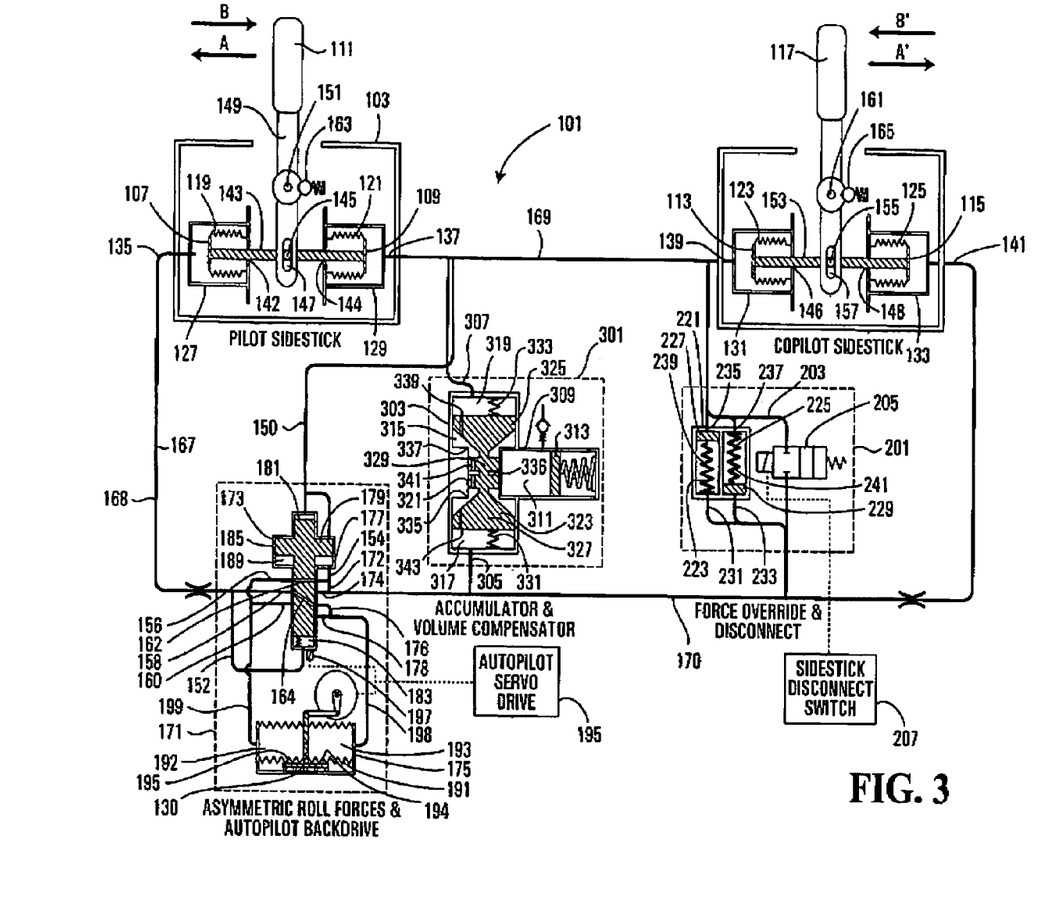
FIG. 3 shows a diagram of a coupling apparatus in a first mode of operation, according to an embodiment of the present invention.
Figure 4:
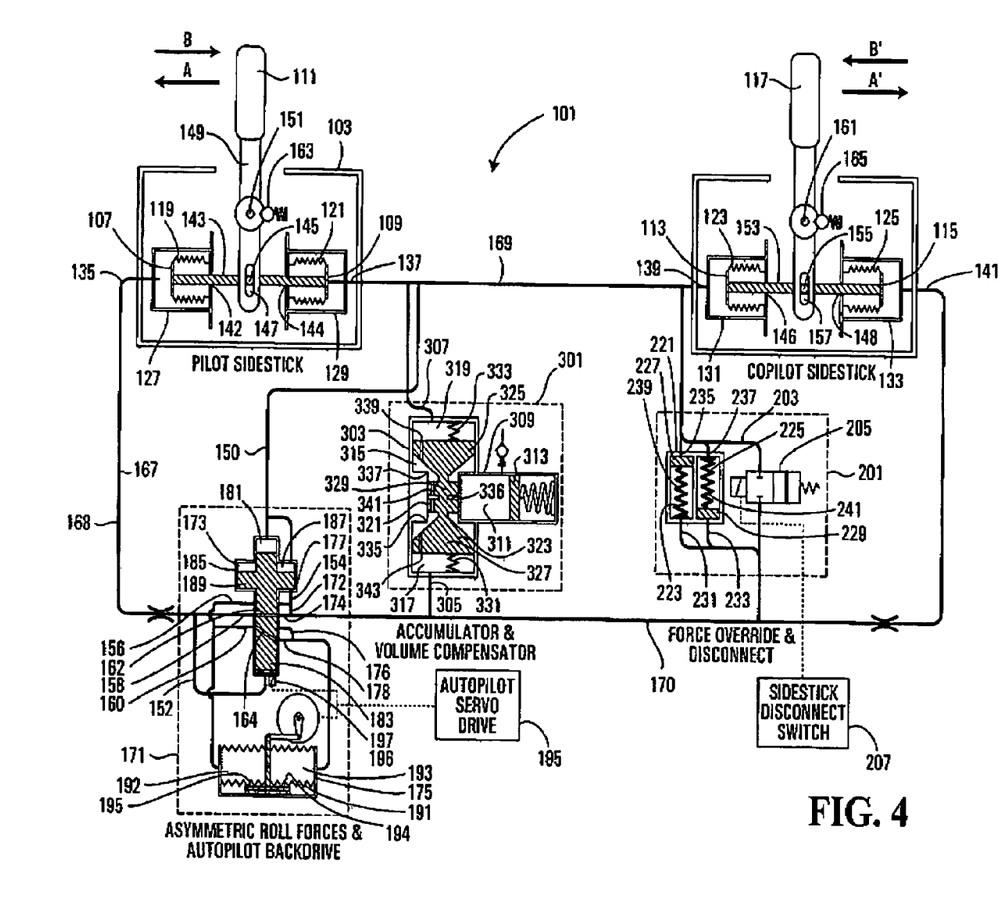
FIG. 4 shows a diagram of the coupling apparatus shown in FIG. 3 in a second mode of operation.

Referring to FIGS. 3 and 4, a coupling apparatus, generally shown at 101 comprises first and second force-activated actuators 103, 105. The first actuator 103 includes first and second fluid displacers 107, 109 coupled to a first, pivotally mounted controller 111 and the second actuator 105 includes third and fourth fluid displacers 113, 115 coupled to a second, pivotally mounted controller 117.

In this embodiment, each fluid displacer 107, 109, 113, 115 comprises an end wall of a respective bellows 119, 121, 123, 125, each of which is enclosed in a chamber 127, 129, 131, 133, each chamber having a fluid inlet/outlet port 135, 137, 139, 141.

The first and second fluid displacers 107, 109 of the first actuator 103 are connected by a first crossbar 143, extending therebetween, and the crossbar is coupled to the first controller 111 via a pin 145 which extends transversely of the longitudinal axis of the crossbar 143 and is received in an aperture 147 formed in the control lever 149 of the controller 111 below the pivotal mounting 151.

Similarly, the third and fourth fluid displacers 113, 115 are coupled by a second crossbar 153, extending therebetween, and the crossbar is coupled to the second controller 117 by a second pin 155 which extends transversely of the longitudinal axis of the second crossbar and is received in a second aperture 157 formed in the lever 159 of the second controller 117 below the pivotal mounting 161.

In this embodiment, each aperture 147, 157 in each of the levers 149, 159 are formed as an elongate slot such that their dimension along the radius extending from the pivot points is larger than the dimension of the pin along the same direction, to allow the pin to move radially as its distance from the pivot point changes with displacement of the controller, and to prevent forces transverse to the length of the crossbar being applied thereto on displacement of the controller.

The first and second chambers 127, 129 have opposed apertures 142, 144 for slidably receiving the first crossbar 143, and the third and fourth chambers 131, 133 have third and fourth proposed apertures 146, 148 for slidably receiving the second crossbar 153. The apertures serve to support and guide the crossbars during lateral displacement.

In this embodiment, a first and second detent 163, 165 are provided which latch a respective controller 111, 117 in the neutral position to provide an indication to an operator when a controller is in the neutral position, and which also assists in maintaining the controller in the neutral position until a threshold, or breakout force is applied to the controller. Each detent may be provided by any suitable device, and in the present embodiment, the detent is provided by a spring loaded ball which engages a disc having a single indentation or notch for receiving the ball in the neutral position and which is mounted to and rotates with the control lever about the pivotal mounting.

In this embodiment, the double bellows arrangement of each actuator enables the actuators to be coupled by two independent fluid couplings. The fluid inlet/output port 135 of the first chamber associated with the first actuator is coupled to the inlet/outlet port 141 of the fourth chamber 133 associated with the second actuator via a first conduit 167, and the inlet/outlet port 137 of the second chamber 129 associated with the first actuator is connected to the inlet/outlet port 139 of the third chamber 131 associated with a second actuator, via a second conduit 169. This arrangement ensures that on deflection of one of the controllers, the fluid of one of the fluid couplings is always in compression. Thus, for example on deflecting the first controller 111 to the left, as indicated by arrow A, the first and second fluid displacers 107, 109 are moved to the right, in which case the fluid coupling the second and third fluid displacers is under compression, and on moving the first controller 111 to the right, as indicated by arrow B, the first and second fluid displacers 107, 109 are moved to the left, in which case the fluid coupling the first and fourth fluid displacers 107, 115 is under compression. The provision of two fluid couplings also provides redundancy in case one of the fluid couplings fails.

Force Controller

The coupling apparatus 101 further includes a force controller 171 which changes the force opposing movement of the first and second controllers 111, 117, depending on the direction in which the force is applied. In the present arrangement, the force controller is adapted to provide a reduced opposing force when either of the first and second controllers are moved in the outboard direction as indicated by arrows A and A', respectively, and to provide an increased opposing with either of the first or second controllers 111, 117 are moved in the inboard direction as indicated by arrows B and B'. The force controller 171 is further adapted to switchably couple and decouple an additional opposing force into the coupling system in response to a differential pressure between the two fluid couplings, as will be described below.

The force controller 171 comprises a switch valve 173 and a device 175 for introducing an additional opposing force into the coupling system, and which, in this embodiment, is switchably coupled into the first fluid coupling provided by the first conduit 167 and the first and fourth fluid displacers 107, 115.

The switch valve 173 comprises a cylinder 177 and a piston 179 disposed within the cylinder. The cylinder includes first and second chambers 181, 183 at opposite ends of the piston, and both the cylinder and piston include an intermediate portion 185 having an expanded waist and forming a third chamber 187 (as best shown in FIG. 4) at one end of the expanded portion of the piston and a fourth chamber 189 (as best shown in FIG. 3) at the opposite end of the expanded portion of the piston.

The first and third chambers 181, 187 are connected to the second conduit 169 via a first fluid line 150, to provide fluid communication with the fluid of the second fluid coupling, the second chamber 183 is connected to a first part 168 of the first conduit 167, which extends between the first actuator 103 and the switch valve 173 via a branched fluid line 152, and the fourth chamber 189 is connected to a second part 170 of the first conduit 167 extending between the second actuator 105 and the switch valve 173 via a fluid line 154. The piston 179 is switchable between a first position as shown in FIG. 3 and a second position as shown in FIG. 4, depending on the difference in pressure of the fluid in the first and second conduits 167, 169 (i.e. the pressure differential between the two fluid coupling systems). In the present embodiment, the piston is biased so as to assume the first position in the absence of any differential pressure for reasons that will be explained below. The biasing force may be provided by any suitable means, and in the present embodiment is provided by a spring positioned in the second chamber 183 and which acts against the end of the piston.

The purpose of the fourth switch valve chamber 189 is to enable the piston to be exposed to the fluid pressure in both the first and second parts 168, 170 of the first conduit 167 which is discontinuous and divided by the switch valve, so that the piston is exposed to the fluid pressure of the first coupling system irrespective of which of the first and second controllers is operated.

The switch valve 173 has first, second and third fluid inlet/outlet ports 156, 158, 160 on the first actuator side, and fourth, fifth, sixth and seventh inlet/outlet ports 172, 174, 176, 178 on the second actuator side. The piston 179 has first and second through holes 162, 164 which connect predetermined inlet/outlet ports on one side of the valve to predetermined inlet/outlet ports on the other side of the valve, depending on the position of the piston.

In this embodiment, the device 175 includes a bellows 191 having two bellows chambers 192, 193 divided by a partition or plate 194 which acts as a fluid displacer, and which may be supported on a movable support 195. The first bellows chamber 192 is connected to the first and third inlet/outlet ports of the switch valve 173, and the second bellows chamber 193 is connected to the sixth and seventh fluid inlet/outlet port 176, 178 of the switch valve. The first part of the first conduit 168 is coupled to the second inlet/outlet port 158 and the second part 170 of the first conduit 167 is connected to the fourth and fifth inlet/outlet ports 172, 174 of the switch valve.

The operation of the force controller will now be described with reference to FIGS. 3 and 4. Referring to FIG. 3, when no force is applied to either controller 111, 117, the switch assumes a first position, as shown in FIG. 3. When an inboard force is applied to either controller 111, 117, as indicated by the arrows B and B', respectively, the driven one of the second and third fluid displacers moves in the opposite direction against the force fight of the other actuator, causing a reduction in pressure of the fluid in the second conduit 169. At the same time, the driven one of the first and fourth fluid displacers 107, 115 also moves in the opposite direction to the applied force, pushing fluid out of the respective chamber and initially against the resiliency of the device 175, causing the pressure in the respective parts 168, 170 of the second conduit to increase. The pressure difference between the fluid in the first and second conduits is applied between the ends of the switch valve piston, and since the pressure in both the second and fourth chambers 183, 189 is greater than the pressure in the first and third chambers 181, 187, the switch valve remains in the first position.

In the first position, the device 175 is coupled into the first fluid coupling to provide an additional force which opposes motion of the fluid displacers when an inboard force is applied to either controller. In this position, the first part 168 of the first conduit 167 is connected through the switch valve to the second bellows chamber 193, and the second part 170 of the first conduit is connected to the first bellows chamber 192.

When an outboard force is applied to either of the first and second controllers 111, 117, as indicated by arrows A and A', respectively, the driven one of the second and third fluid displacers 109, 113 applies a force on the fluid of the second fluid coupling against the force fight provided by the other actuator thereby increasing the fluid pressure. At the same time, the driven one of the first and fourth fluid displacers 107, 115, moves in the opposite direction, tending to draw fluid into the chamber against the force fight provided by the resiliency of the device 175, resulting in a reduced pressure of fluid in the first conduit 167. This pressure difference is applied between opposite ends of the switch valve piston and as the pressure in the second conduit 169 is greater than that of the first conduit 167, and the pressure difference exerts a force greater than that exerted by the bias spring, the switch valve piston moves to its second position, as shown in FIG. 4. In this position, the switch valve directly connects the first and second parts 168, 170 of the first conduit 167, decouples the device 175 from the first conduit 167 and connects the first bellows chamber 192 to the second bellows chamber 193 to allow fluid to flow therebetween, equalizing the pressure in the bellows chambers so that the bellows and the fluid displacer returns to its neutral position when the device 175 is decoupled from the system.

The actuators may be used to control any one or more parameters of a system in which they are incorporated. In the present embodiment, the controllers provide an interface to enable the parameter(s) to be controlled by a human operator. The system may further include a means for controlling the parameter(s) automatically, for example under the control of a computer or other processor or another controller. For example, the actuators may be incorporated in an aircraft control system, for example, for controlling the roll of the aircraft, and the system may include an onboard computer which provides an autopilot function. The controllers 111, 117 may be back driven by an onboard computer to provide a visual cue to the pilot and/or co-pilot as to the actions being performed by the computer. In one embodiment, the controllers may be back driven by driving the fluid displacer of the device 175. Referring again to FIGS. 3 and 4, an example of a back drive system includes a back drive controller 195 which is coupled to drive displacement of the fluid displacer 194 of the device 175 via a suitable coupling, for example a crank mechanism 196. The back drive system 195 further includes a solenoid valve or any other suitable means for maintaining the switch valve piston in its first position so that the device 175 is coupled into the actuator coupling system while the back drive controller is operating.

Actuator Decoupling and Force Override System

The coupling apparatus may include a system which allows the actuators to be decoupled from one another and an embodiment of a decoupling system is shown in FIGS. 3 and 4. The decoupling system 201 includes a fluid line 203 connected between the first and second conduits 167, 169, an electrically operated valve 205 connected in the fluid line 203 and a valve control switch 207. When the valve 205 is closed, the valve 205 prevents fluid flowing through the fluid line 203 so that the actuators are coupled together. When the valve 205 is opened, fluid can freely pass between the first and second chambers 127, 129 of the first actuator and between the third and fourth chambers 131, 133 of the second actuator, via the fluid line 203 so that the first and second controllers become decoupled from one another. Preferably, the valve is arranged such that electrical power is required to maintain the valve closed and the actuators coupled, and the valve 205 assumes an open state in the absence of electrical power. Advantageously, this allows the controllers to move freely and independently of one another thereby preventing damage to the coupling system if the controllers are accidentally knocked, when the system in which the actuators are incorporated is not in use. Furthermore, if the system, such as an aircraft, suffers a power failure, this arrangement allows the controllers to be automatically decoupled in such an event for increased safety and pilot control. The switch 207 may permit manual operation so that an operator can control the coupling and decoupling of the actuators, and allow an operator to decouple the controllers, for example in an emergency situation, e.g. if one of the controllers jams.

The coupling apparatus may include a means for decoupling the actuators if an excessive differential force is applied to the controllers. An example of a force override system according to another aspect of the present invention which provides this function is incorporated in the embodiment of FIGS. 3 and 4. A force override system 221 includes first and second chambers 223, 225 and first and second pistons 227, 229 located in a respective chamber 223, 225. Each chamber has a first fluid inlet/outlet port 231, 233 connected to the first conduit 167 and a second fluid inlet/outlet port 235, 237 connected to the second conduit 169. A first biasing means, for example a spring 239 is located within the first chamber 223 and biases the first piston 227 towards the second inlet/outlet port 235, and a second biasing means, for example a spring 241 is located within the second chamber 225 and is arranged to urge the second piston 229 towards the first inlet/outlet port 233. The biasing means are arranged such that when a differential force between the controllers exceeds a threshold value, the coupling force between the controllers is overcome, allowing the controllers to be moved relative to one another. The first force override unit, comprising the first chamber 223, piston 227 and biasing means 239 allows the coupling to be overridden when the differential force is applied in the inboard direction, and the second force override unit which comprises the second chamber 225, the second piston 229 and the second biasing means 241 allows the coupling to be overridden when the differential force between the controllers is applied in the outboard direction. In a preferred embodiment, the biasing means is arranged to apply a force which is equal to or exceeds that produced by the force fight of an actuator and the force controller on full deflection of one of the controllers in the inboard direction, and is equal to or exceeds the force produced by the force fight of an actuator when one of the controllers is moved to its full deflection in the outboard direction.

The fluid used in the coupling system may comprise a liquid, and preferably a substantially incompressible liquid. With the actuators in their neutral position, the liquid in the coupling system may be at any required or desirable pressure, for example substantially atmospheric pressure, below atmospheric, or the liquid may be pressurized above atmospheric pressure. Pre-pressurization of the liquid may increase its incompressibility and thereby increase the stiffness of the coupling.

The coupled actuator system may be subjected to temperature changes and this may cause the liquid to expand and exert undue pressure on the coupling system components. According to one aspect of the present invention, embodiments of the coupling apparatus may include a volume compensator coupled to the fluid coupling system to allow the liquid to expand in a way which does not exert undue or excessive pressure on the coupling system. A volume compensator according to an embodiment of the present invention is incorporated in the coupling apparatus shown in FIGS. 3 and 4.

Referring to FIGS. 3 and 4, a volume compensator 301 comprises a valve device 303 having a first inlet/output port 305 coupled to the first conduit 167 and a second inlet/outlet port 307 coupled to the second conduit 169. The volume compensator further comprises an accumulator device 309 having a chamber 311 for containing fluid, a piston or fluid displacer 313 disposed within the chamber and biasing means 315 for providing a biasing force against the piston 313 which tends to urge the piston into the chamber 311.

The valve device 303 comprises a cylinder 315 forming opposed end chambers 317, 319 and having a narrower middle portion 321. A piston 323 is located in the cylinder, the piston having opposed ends 325, 327 disposed within a respective end chamber 317, 319, and a middle part 329 adjoining the ends and which is disposed within the middle portion of the cylinder 321. The valve device 303 further includes first and second biasing means 331, 333, for example springs, which act on the piston 323 in opposite directions to maintain the piston in a neutral position.

The accumulator chamber 311 has an aperture 336 which together with flow passages formed in the piston 323 allows fluid communication between the accumulator chamber 331 and the first and second valve inlet/outlet ports 305, 307 when the piston is in its neutral position. Thus, in the neutral position, fluid is free to flow from each of the first and second conduits 167, 169 into the accumulator chamber 311, allowing the fluid to expand into the accumulator chamber against the piston 313. Similarly, in the valve neutral position, fluid may flow from the accumulator chamber 313 into the first and second conduits 167, 169, allowing the liquid to contract and thereby alleviating excessive pressure on the coupling components. During contraction of the liquid, the volume of the system is also reduced on movement of the piston 313 into the accumulator chamber 311 under the biasing force provided by the biasing means. In other embodiments, the biasing force may be provided by other means, such as by gravity, or by a gas spring, although in the latter ease, it is preferable that a means such as a piston or solid interface is provided at the liquid to prevent gas contact with the liquid which may result in absorption of gas into the liquid thereby reducing its stiffness or incompressibility.

In a preferred embodiment, the force controller 171 is accessible to the volume compensator in the absence of an applied force to the controllers, and the switch valve is arranged to couple the force controller into the fluid coupling system in the absence of a differential pressure. A means is preferably provided to enable fluid in the first part 168 of the first conduit 167 and fluid in the conduit 198 of the force controller to flow to and from the accumulator chamber 311 when the volume compensator valve is in the neutral position. Advantageously, this may be provided by an orifice 130 formed in the displacer plate of the device 175. Preferably, the orifice is of a restrictive size so that the permitted fluid flow therethrough does not significantly reduce the opposing force provided by the device 175.

On displacement of a controller from its neutral position, a differential pressure exists between the fluid in the first and second conduits 167, 169, and this differential pressure is applied across the volume compensator valve piston, causing displacement of the valve piston until one of the ends of the piston rests against a respective valve seat 335. 337. This prevents fluid from flowing between the first and second inlet/outlet ports 305, 307 of the valve device 303, via the piston flow passages 339, 341, 343, thereby maintaining a stiff coupling between the actuators. At the same time, the middle portion 329 of the piston 323 closes the aperture 336 of the accumulator chamber 311, thereby also preventing fluid communication between the accumulator chamber 311 and either of the first and second conduits 167, 169 and in particular the conduit whose respective valve 323, 325 is not resting against its valve seat 335, 337. Thus, when a differential pressure exists between the fluid in the first and second conduits, the volume compensator valve is operated both to prevent fluid flowing through the valve between the first and second conduits and also between the accumulator chamber 311 and both conduits.

The volume compensator valve may also be operable to prevent fluid from flowing from one fluid coupling system to the other fluid coupling system, if the integrity of one of the coupling systems experiences a fault or failure so that fluid leaks from the system, as may be caused for example by puncturing or severing a system component such as one of the fluid conduits 167, 169. The resulting leakage from one of the coupling systems will reduce the fluid pressure relative to the other system so that a differential pressure is applied across the compensator valve, causing the valve to close. This prevents fluid from flowing from the undamaged coupling system to the leaking coupling system, thereby maintaining coupling between the actuators.

In one embodiment, either one or both of the fluid coupling systems may include sensor means for monitoring a parameter indicative of the pressure of the coupling system and may include an arrangement for providing an indication of the pressure to an operator. Such a sensor may be particularly beneficial for monitoring any leakage in the coupling system, and in one embodiment, the sensor may be arranged the monitor the position and/or the rate of displacement of the accumulator piston 313. Alternatively, or in addition, the position of the valve piston 323 and/or the length of time that the valve piston 323 remains in a particular position may be monitored and used to provide an indication of an excessive pressure drop of leakage in the coupling system.

Referring again to FIGS. 3 and 4, the accumulator valve is arranged such that, in its neutral position, fluid can flow between the two fluid coupling systems. Advantageously, this allows a more precise re-centering of the controllers when they are released, and in the case of a fly-by-wire system, this re-centering minimizes position mismatch when the information is sent to the fly-by-wire control computer(s). If the two coupling systems are maintained independent of one another, a small position offset can build-up between the controllers due to effects such as small temperature differences between the two systems, for example between the first and second fluid conduits 167, 169, or between the bellows, mechanical compliance of one or both of the actuator systems, or small fluid leakage through the force override and/or coupling disconnect mechanism. The offset may result in a pressure difference between the fluid systems, and in the preferred implementation, the first and second biasing means 331, 333 may have a spring force constant chosen such that the valve remains open (i.e. the valve piston does not contact either of the valve seats) at low values of differential pressure, i.e. when the controllers are released and are close to the neutral position. This allows fluid to flow between the fluid coupling systems (e.g. between the first and second conduits) and therefore enables each controller to return its neutral position, as dictated for example by its own breakout mechanism.

A differential pressure between the two fluid systems may be produced such that the volume compensator valve closes by virtue of a difference in the volume of fluid in the two coupling systems, even though the fluid in both systems is subjected to the same temperature. To prevent valve closure, the fluid systems may be arranged such that both contain substantially the same volume of fluid, or any difference in the volume of fluid is insufficient to cause the valve to close when both systems are at substantially the same temperature. In one embodiment, one of the fluid systems may include an additional accumulator to better match their fluid volumes. For example, in the embodiment of FIGS. 3 and 4, the first fluid system, which includes the first conduit 167 and the asymmetric force control circuit may have a larger volume than the second fluid coupling system which includes the second conduit 169. In this case, an additional accumulator could be connected into the second coupling system to increase the fluid volume thereof.

Alternatively, or in addition, the first and second biasing means of the volume compensator valve may have different spring force constants so that the valve piston is maintained in its neutral position in the presence of a differential pressure caused by differences in fluid volumes between the two systems.

The volume compensator may further include a source of additional coupling fluid connected, for example, to the accumulator chamber 311, and a valve such as a non-return valve 312 may be provided by the source and fluid system to enable the fluid which may leak from the system to be replenished, as necessary.

Figure 5:
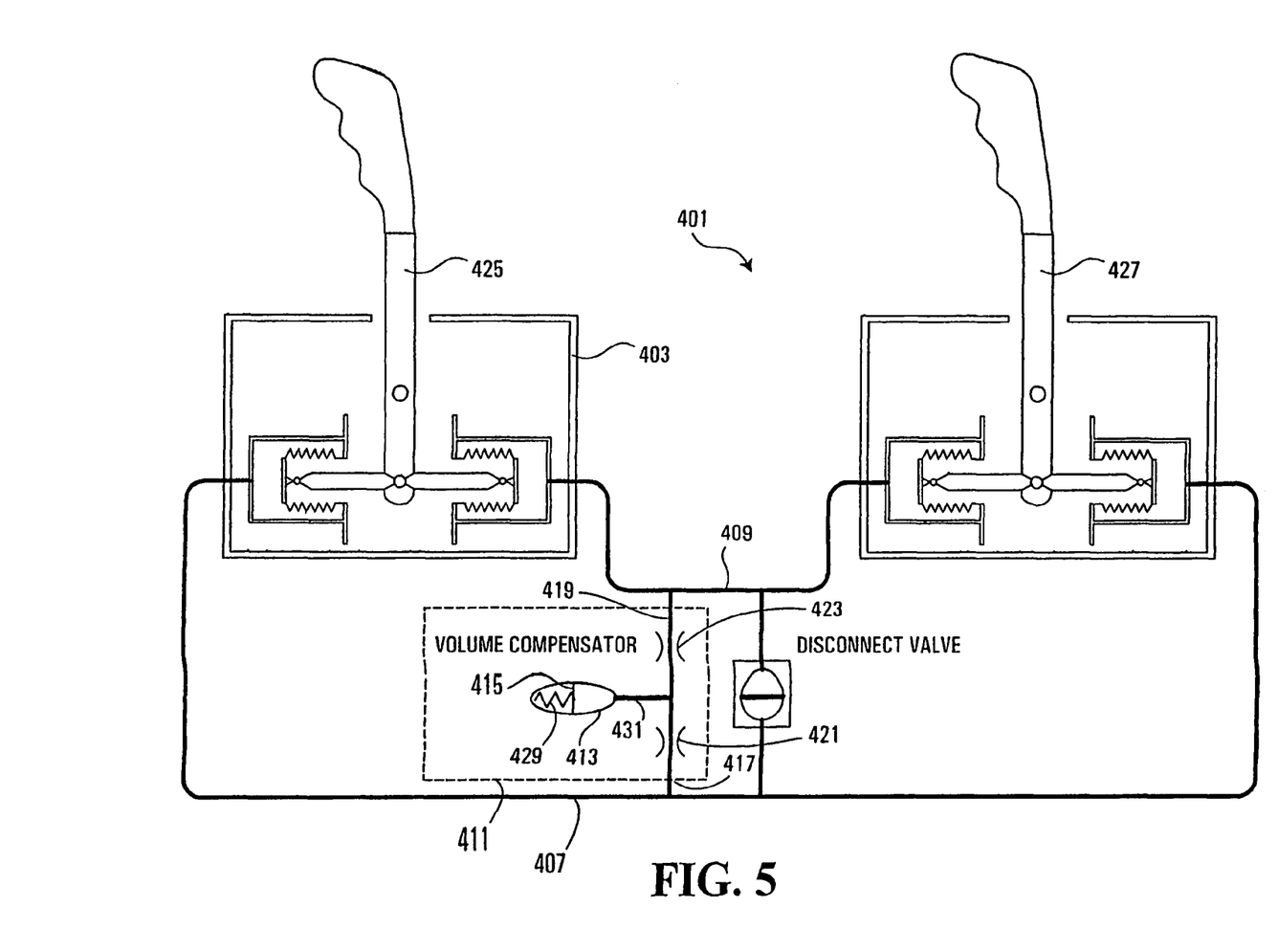
FIG. 5 shows a diagram of a coupling apparatus according to another embodiment of the present invention.

Another embodiment of a volume compensator is shown in FIG. 5. Referring to FIG. 5, a coupling apparatus, generally shown at 401 comprises first and second actuators 403, 405 coupled by first and second fluid systems which include first and second fluid conduits 407, 409. The apparatus includes a volume compensator 411, comprising an accumulator chamber 413 and a fluid displacer 415 disposed within the chamber 413, the accumulator chamber 413 being connected to the first conduit 407 via a connecting conduit 417, and to the second conduit 409 via a connecting conduit 419. The connecting conduits 417, 419 include a first and second restrictor 421, 423, respectively to restrict the flow of fluid between the first and second conduits 407, 409. The restrictors are sized to restrict the flow of fluid between the first and second conduit such that coupling between the first and second actuators 403, 405 is maintained. The force fight between the actuators may produce a slow position drift between the controllers 425, 427, during operation, although when the controllers 425, 427 are released, the flow of fluid which is permitted the first and second conduits 407, 409 enables the controllers to be re-entered. The position drift or offset resulting from operation of the controllers may be rendered insignificant if the restrictors are small enough.

In other embodiments, a single restrictor or more than two restrictors may be provided between the first and second conduits. In the embodiment of FIG. 5, the volume compensator further includes a biasing means 429 which biases the fluid displacer 415 towards the inlet/outlet port 431 of the accumulator chamber 413.

In other embodiments of the present invention, the fluid displacer system coupled to one or more of the controllers may comprise a piston and cylinder combination, in which the piston is slidably received within the cylinder, rather than the bellows system, examples of which are described above with reference to FIGS. 1 to 5. A biasing means may be arranged to provide a force which tends to return a controller to its neutral position when the controller is released.

In other embodiments of the present invention, the controllers may be coupled by a solid coupling, rather than a fluid coupling, and the force controller may be provided a fluid system which is activated in response to a parameter indicative of the direction a force applied to a controller. For example, the mechanical coupling may be such that a compressional force applied thereto produces a small compression of the coupling which activates a valve which causes the additional force system to be coupled to a controller.

Figure 6:
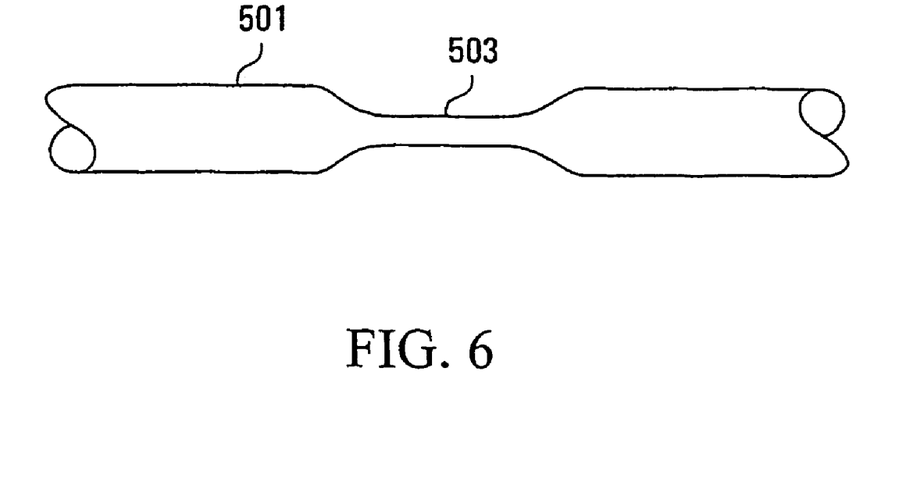
FIG. 6 shows a schematic diagram of one embodiment of a restrictor, which may be employed in embodiments of the present invention.

In other embodiments of the present invention, the device which provides an additional force for the coupling system may comprise a fluid restrictor as for example shown in FIG. 6 which provides a resistance to the flow of fluid therethrough, and which is coupled into the system to provide asymmetric field force. In other embodiments, the device which provides the additional force may comprise any other suitable arrangement which provides the required force, and may be adapted to provide a force which is either independent or dependent on displacement, dependent on the rate of displacement, or dependent on the rate of change of displacement, and the arrangement may be adapted such that the force profile changes with position, velocity or acceleration of a controller in order to provide the required or desired field.

Embodiments of the coupling apparatus may include any one or more of the features described herein.

Modifications to the embodiments disclosed herein will be apparent to those skilled in the art.

What is claimed is:

1. An apparatus comprising first and second force-activated actuators, said first actuator comprising a first fluid displacer and force receiving means coupled to said first fluid displacer,
    said second actuator comprising a second fluid displacer and a second force receiving means coupled to said second fluid displacers,
    a conduit for transporting fluid between said first and second fluid displacers in response to motion of a said fluid displacer to cause motion of the other said fluid displacer, and
    a force controller responsive to the pressure of said fluid for controlling a force opposing displacement of a fluid displacer.

2. An apparatus as claimed in claim 1, wherein said force controller comprises resistance means for resisting movement of a fluid displacer, and
    switch means responsive to said fluid pressure for switchably coupling said resistance means to a fluid displacer.

3. An apparatus as claimed in claim 2, wherein said resistance means includes a third fluid displacer coupleable to at least one of said first and second fluid displacers by means of a fluid therebetween and wherein said switch is operable to couple said third fluid displacer to said at least one of said first and second fluid displacers by permitting fluid communication therebetween.

4. An apparatus as claimed in claim 3, wherein said switch is operable to couple fluid from said conduit to said third fluid displacer.

5. An apparatus as claimed in claim 4, wherein said third fluid displacer has first and second ends, and wherein said switch is operable to permit fluid communication between said first fluid displacer and said first end and between said second fluid displacer and said second end.

6. An apparatus as claimed in claim 2, wherein said switch means is adapted to be driven by said fluid pressure to couple said resistance means to a fluid displacer.

7. An apparatus as claimed in claim 2, wherein said switch means has a first switch mode in which said resistance means is coupled to a fluid displacer and a second mode in which said switch means de-couples said resistance means from a fluid displacer.

8. An apparatus as claimed in claim 7, wherein said switch means adopts said first mode when said pressure exceeds a predetermined value and adopts said second mode when said pressure is at or below said predetermined value.

9. An apparatus as claimed in claim 7, wherein said switch means adopts said first mode when said pressure is below a predetermined value and adopts said second mode when said pressure is at or above said predetermined value.

10. An apparatus as claimed in claim 1, further comprising a second fluid coupling system coupling said first and second actuators, wherein said second fluid coupling system is arranged such that application of a force to one or said force receiving means in one direction, the pressure of fluid in said conduit increases and the pressure of fluid in said fluid coupling system decreases, and said force controller is responsive to the difference in pressure between the fluid in said conduit and in said second fluid coupling to control a force opposing displacement of a fluid displacer.

11. An apparatus as claimed in claim 10, wherein said second fluid coupling system comprises another fluid displacer coupled to said first fluid displacer and a further fluid displacer coupled to said second fluid displacer and a second conduit for transporting fluid between said other and said further fluid displacers for coupling the motion of said other and further fluid displacers.

12. An apparatus as claimed in claim 10, wherein said force controller comprises resistance means for resisting movement of a fluid displacer, and switch means responsive to the difference in pressure of the fluid in said conduit and the fluid in said second fluid coupling.

13. An apparatus as claimed in claim 12, wherein said switch means is adapted to couple said resistance means to a fluid displacer when said pressure difference is below a predetermined value.

14. An apparatus as claimed in claim 13, wherein said switch means is adapted to couple said resistance means to a fluid displacer when said pressure difference is between zero and said predetermined value.

15. An apparatus as claimed in claim 1, wherein at least one of said force receiving means comprises a controller.

16. An apparatus as claimed in claim 15, wherein at least one of said first and second force receiving means comprises a lever.

17. An apparatus as claimed in claim 16, wherein at least one of said first and second force receiving means comprises a sidestick.

18. An apparatus as claimed in claim 1, installed in an aircraft and adapted to control said aircraft in response to movement of said first and second force receiving means.

19. An apparatus as claimed in claim 1, wherein said resistance means comprises a third fluid displacer and biasing means adapted to oppose movement of said fluid displacer.

20. An apparatus as claimed in claim 19, wherein said resistance means comprises a bellows.

21. An apparatus as claimed in claim 19, further comprising driving means for driving displacement of said third fluid displacer independently of said first and second force receiving means.

22. An apparatus as claimed in claim 21, wherein driving means comprises a processor controlled motor.

23. An apparatus comprising first and second force-activated controllers, a coupling for coupling motion of said controllers, and a force controller responsive to a parameter indicative of the direction of force applied to a controller for controlling a force opposing displacement of said controllers and comprising a fluid displacer coupled to a controller, resistance means for receiving fluid and value means responsive to said parameter for causing fluid to be introduced to said resistance means by said fluid displacer.

24. An apparatus as claimed in claim 23, further comprising a chamber for slidably receiving said fluid displacer and means for feeding fluid from said chamber to said resistance means.

25. An apparatus as claimed in claim 23, wherein said resistance means comprises a second fluid displacer and biasing means opposing displacement of said second fluid displacer.

26. An apparatus as claimed in claim 23, wherein said resistance means comprises a variable volume chamber.

27. An apparatus as claimed in claim 26, wherein said resistance means comprises a bellows.

28. An apparatus as claimed in claim 23, wherein said resistance means comprises a conduit for receiving fluid, wherein the conduit is sized to resist the flow of fluid therethrough.

29. An apparatus as claimed in claim 23, wherein said valve means is adapted to switchably cause and to prevent fluid to be introduced to said resistance means by said fluid displacer in response to a change in the value of said parameter.

30. An apparatus as claimed in claim 23, wherein said parameter is a force applied to said coupling.

31. An apparatus as claimed in claim 23, wherein said valve means is adapted to cause fluid to be introduced to said resistance means by said fluid displacer on application of a force to a controller in one direction and substantially prevent fluid being introduced to said resistance means by said fluid displacer on application of a force to said controller in the other direction.

32. An apparatus as claimed in claim 23, wherein said coupling comprises a fluid coupling, and said parameter comprises the pressure of said fluid coupling.

33. An apparatus as claimed in claim 23, wherein said coupling comprises first and second fluid couplings arranged such that on application of a force in one direction to a controller, the pressure of one of said first and second fluid couplings increases and the pressure of the other fluid coupling decreases, and wherein said parameter is the difference in pressure between said first and second fluid couplings.

34. An apparatus comprising first and second force-activated actuators, said first actuator having a first movable controller and said second actuator having a second movable controller, a first fluid coupling coupling said first and second controllers, a first fluid accumulator and a first pressure responsive means responsive to the pressure of fluid of said fluid coupling for permitting fluid from said coupling to flow into said first accumulator when the pressure of fluid in said coupling exceeds a predetermined value, and further comprising a second fluid coupling coupling said first and second controller, a second accumulator and a second pressure responsive means responsive to the pressure of fluid in said second fluid coupling for permitting fluid to flow from said second fluid coupling into said second accumulator when the pressure of fluid in said second fluid coupling exceeds a predetermined value.

35. An apparatus as claimed in claim 34, wherein said second pressure responsive means is adapted to draw fluid from said second accumulator chamber into said second fluid coupling when the fluid pressure in said second fluid coupling thus below a predetermined value.

36. An apparatus as claimed in claim 34, wherein said first and second fluid couplings are arranged such that when one of said first and second controllers is displaced in one direction, the pressure of fluid in said first coupling system increases, and when said controller is displaced in the opposite direction, the pressure of fluid in said second fluid coupling increases.

37. An apparatus comprising first and second force-activated actuators, said first actuator having a first movable controller and said second actuator having a second movable controller, first and second fluid coupling systems coupling said first and second controllers and an electrically operated valve for switchably coupling and de-coupling said first fluid coupling system to said second fluid coupling system, wherein said valve is adapted to permit fluid to flow between first and second fluid coupling systems in the absence of electrical power thereto.

38. An apparatus comprising first and second force-activated actuators, said first actuator having a first movable controller and said second actuator having a second movable controller, first arid second fluid coupling systems coupling said controllers and a volume compensator comprising an accumulator chamber, valve means having first and second inlet/outlet ports, said first inlet/outlet port being connected for fluid communication with said first fluid coupling system and said second inlet/outlet port being coupled for fluid communication with said second fluid coupling system, said valve means being responsive to a differential pressure between the fluid in said first and second fluid coupling systems such that when said differential pressure is below a predetermined value, said valve means permits fluid communication between at least one of said fluid coupling systems and said accumulator chamber.

39. An apparatus as claimed in claim 38, wherein said valve means is adapted to permit fluid communication between said accumulator chamber and both first and second fluid coupling systems when said differential pressure is below a predetermined value.

40. An apparatus as claimed in claim 38, wherein said valve means is adapted to prevent fluid communication between at least one of said fluid coupling systems and said accumulator chamber when said differential pressure exceeds a predetermined value.

41. An apparatus as claimed in claim 40, wherein said valve means is adapted to prevent fluid communication between said accumulator chamber and both said first and second fluid coupling systems when said differential pressure exceeds a predetermined value.

42. An apparatus as claimed in claim 38, wherein said valve means is adapted to permit fluid to flow between said first and second inlet/outlet ports when said differential pressure is below a predetermined value.

43. An apparatus as claimed in claim 38, wherein said valve means is adapted to prevent fluid flow between said first and second inlet/outlet ports when said differential pressure exceeds a predetermined.

44. Au apparatus as claimed in claim 38, wherein said valve means is adapted to permit fluid communication between said first and second inlet/outlet ports and between each of said inlet/outlet ports and said accumulator chamber when said differential pressure is below a predetermined value.

45. An apparatus as claimed in claim 38, wherein said valve means is adapted to prevent fluid communication between said first and second inlet/outlet ports and between said accumulator chamber and said first and second inlet/outlet ports when said differential pressure exceeds a predetermined value.

46. An apparatus as claimed in claim 38, wherein said valve means comprises first, second and third interconnected valve members, first and second valve seats for said first and second valve members, respectively, wherein when either of said first and second valve members abuts a respective valve seat, said valve prevents fluid flow between said first and second inlet/outlet ports, and said third valve member seals said accumulator chamber to prevent fluid flow between said accumulator chamber and said first and second inlet/outlet ports.

47. An apparatus as claimed in claim 46, wherein said third valve member is located between said first and second valve members.

48. An apparatus as claimed in claim 46, wherein when neither of said first and second valve members are spaced from their respective valve seat, said valve is operative to permit fluid to flow between said first and second inlet/outlet ports, and between said accumulator chamber and said first and second inlet/outlet ports.

49. An apparatus as claimed in claim 38, further comprising a source of fluid coupled to said accumulator chamber.

50. An apparatus as claimed in claim 38, further comprising a fluid displacer in said accumulating chamber and biasing means for biasing said fluid displacer against fluid in said accumulator chamber.

51. An apparatus as claimed in claim 38, further comprising biasing means for biasing said valve means in an open position to enable fluid communication between at least one of said first and second fluid coupling systems and said accumulator chamber.

52. An apparatus comprising first and second force-activated actuators, said first actuator having a first movable controller and said second actuator having a second movable controller, first and second fluid coupling systems coupling said first and second controllers, and coupling means for permitting fluid to flow between said first and second systems at least one of (1) when said first and second controllers are in a predetermined position and (2) when substantially no external force is applied to said controllers, and (3) when any difference in the pressure of fluid between said first and second coupling systems falls below a predetermined value.

53. An apparatus as claimed in claim 52, wherein said first fluid coupling system comprises a first fluid displacer coupled to said first controller, a second fluid displacer coupled to said second controller, and a first conduit for transporting fluid between said first and second fluid displacers thereby coupling their motion, and said second fluid coupling system comprises a third fluid displacer coupled to said first controller, a fourth fluid displacer coupled to said second controller and a second conduit for transporting fluid between said third and fourth fluid displacers, thereby coupling their motion.

54. An apparatus as claimed in claim 53, wherein said first and third fluid displacers are arranged such that on movement of said first fluid displacer in one direction, said first fluid displacer moves fluid into said first conduit and said third fluid displacer draws fluid from said second conduit.

55. An apparatus as claimed in claim 53, wherein said second and fourth fluid displacers are arranged such that on movement of said second fluid displacer in one direction, said second fluid displacer draws fluid from said first conduit, and said fourth fluid displacer moves fluid in to said second conduit.

56. An apparatus as claimed in claim 52, further comprising biasing means arranged to provide a biasing force which tends to move said first and second controllers towards said predetermined position.

57. An apparatus as claimed in claim 52, wherein said coupling means comprises a conduit providing fluid communication between said first and second fluid coupling systems, said conduit providing a resistance to fluid flow greater than said first and second coupling systems.

58. An apparatus as claimed in claim 52, wherein said coupling means comprises valve means responsive to fluid pressure in at least one of said first and second fluid coupling systems, and which is adapted to permit fluid to flow between said first and second coupling systems in response to said pressure.

* * * * *